(12) United States Patent
Gilgenbach et al.

(10) Patent No.: US 6,801,865 B2
(45) Date of Patent: Oct. 5, 2004

(54) METER MONITORING AND TAMPER PROTECTION SYSTEM AND METHOD

(75) Inventors: Alan M. Gilgenbach, Waukesha, WI (US); Richard Armbrust, Brookfield, WI (US); Daniel J. Collins, Mequon, WI (US); James P. Conigliaro, Milwaukee, MI (US); Jeffery Zingsheim, Franklin, WI (US); Timothy A. Beck, Caledonia, WI (US); Usha H. Venkatesh, Milwaukee, WI (US); Andrew H. Aiken, Milwaukee, WI (US); Kenneth G. Dunahee, Greenfield, WI (US)

(73) Assignee: Engage Networks, Inc., Milwaukee, WI (US)

( * ) Notice: Subject to any disclaimer, the term of this patent is extended or adjusted under 35 U.S.C. 154(b) by 180 days.

(21) Appl. No.: 10/103,659

(22) Filed: Mar. 21, 2002

(65) Prior Publication Data

US 2003/0179714 A1 Sep. 25, 2003

(51) Int. Cl.⁷ .............................................. G06F 11/32
(52) U.S. Cl. .......................................... 702/61; 714/25
(58) Field of Search ......................... 702/61, 185, 187, 702/57–62, 182, 183, 188, 189; 324/500, 512, 522, 647; 714/25, 721, 746

(56) References Cited

U.S. PATENT DOCUMENTS

| | | |
|---|---|---|
| 4,766,330 A | 8/1988 | Dreier |
| 5,086,292 A | 2/1992 | Johnson et al. |
| 5,243,338 A | 9/1993 | Brennan, Jr. et al. |
| 5,248,935 A | 9/1993 | Sakoyama et al. |
| 5,252,967 A | 10/1993 | Brennan et al. |
| 5,345,225 A * | 9/1994 | Davis ........................ 340/635 |
| 5,473,322 A * | 12/1995 | Carney ................. 340/870.02 |
| 5,488,565 A | 1/1996 | Kennon et al. |
| 5,548,527 A | 8/1996 | Hemminger et al. |
| 5,572,438 A | 11/1996 | Ehlers et al. |
| 5,586,130 A | 12/1996 | Doyle |
| 5,590,179 A | 12/1996 | Shincovich et al. |
| 5,617,084 A | 4/1997 | Sears |
| 5,696,695 A | 12/1997 | Ehlers et al. |
| 5,710,889 A | 1/1998 | Clark et al. |
| 5,767,790 A | 6/1998 | Jovellana |

(List continued on next page.)

*Primary Examiner*—Marc S. Hoff
*Assistant Examiner*—Edward Raymond
(74) *Attorney, Agent, or Firm*—Michael Best & Friedrich LLP

(57) ABSTRACT

A commodity-meter management system including commodity meters (e.g., electrical energy meters, gas meters, and/or water meters), one or more servers, and a communications application to communicate between the meters and the servers. The meters are connected to the servers via communication mediums. The communications application can communicate bi-directionally in real-time between the meters and the servers via the communication mediums. The communications application can determine the actual configuration parameters according to which the meter is operating at any given time. In order to detect theft of a commodity, the communications application can compare the actual configuration parameters to default configuration parameters. If the actual and default configuration parameters are not equal, substantially equal, or within a predetermined threshold, the communications application indicates that a tamper event has occurred.

90 Claims, 5 Drawing Sheets

U.S. PATENT DOCUMENTS

| | | | |
|---|---|---|---|
| 5,898,387 A | | 4/1999 | Davis et al. |
| 5,910,774 A | * | 6/1999 | Capriotti et al. ............ 340/637 |
| 5,918,380 A | | 7/1999 | Schleich et al. |
| 5,940,009 A | * | 8/1999 | Loy et al. .............. 340/870.02 |
| 5,959,876 A | | 9/1999 | Gordon et al. |
| 5,994,892 A | | 11/1999 | Turino et al. |
| 6,078,785 A | | 6/2000 | Bush |
| 6,118,269 A | | 9/2000 | Davis |
| 6,163,602 A | | 12/2000 | Hammond et al. |
| 6,172,616 B1 | | 1/2001 | Johnson et al. |
| 6,178,362 B1 | | 1/2001 | Wollard et al. |
| 6,181,257 B1 | | 1/2001 | Meek et al. |
| 6,216,956 B1 | | 4/2001 | Ehlers et al. |
| 6,232,886 B1 | * | 5/2001 | Morand ................. 340/870.02 |
| 6,246,667 B1 | | 6/2001 | Ballintine et al. |
| 6,262,672 B1 | | 7/2001 | Brooksby et al. |
| 6,300,881 B1 | | 10/2001 | Yee et al. |
| 6,333,975 B1 | | 12/2001 | Brunn et al. |
| 6,362,742 B1 | | 3/2002 | Serenil, Jr. |
| 6,657,552 B2 | * | 12/2003 | Belski et al. .......... 340/870.02 |

* cited by examiner

METER MONITORING AND TAMPER PROTECTION SYSTEM AND METHOD

FIELD OF THE INVENTION

This invention relates generally to meter systems and methods, and more particularly to meter control and tamper protection systems and methods.

BACKGROUND OF THE INVENTION

Utilities provide commodities such as electricity, gas, and water to the public, preferably at the least possible cost to each consumer. However, each year utilities are subject to increasing costs due to distribution losses. For example, many electrical utilities suffer significant and rising distribution costs year after year. The utilities are forced to pass these distribution losses along to the paying consumers. While certain amounts of electricity, gas, water, and other commodities are lost due to the technical limitations of the various distribution systems, large quantities of these commodities are stolen. The electrical and gas utilities refer to these losses as "non-technical distribution losses" or "energy theft". The various utilities typically write off these losses as unrecoverable due to a general lack of evidence available to prove energy theft. Unfortunately, such theft and losses have become an increasing problem for many utilities. For example, energy theft is becoming a major problem for electrical utilities across the globe, and the economic losses to electrical and gas utilities resulting from energy theft soars into the hundreds of millions of dollars. In addition to the commodities offered by energy utilities, any type of commodity that is measured by meters, such as oil, gasoline, and telephone services, can also be stolen.

Meter tampering is one form of theft (whether energy theft or theft of another commodity). One method of meter tampering is for a person to physically damage the meter or the lines surrounding the meter. For example, a person may remove one or more power line connections (for electrical energy meters), bypass the meter, or reverse the meter's direction of operation. Another method of meter tampering is for a person to change the internal settings of the meter, such as by reprogramming the meter's configuration parameters. Generally, in order for a person to reprogram a meter, the person must have access to the meter programming hardware and software and in some cases must have knowledge of the meter's password. Due to the access and knowledge required to reprogram a meter, this type of meter tampering often involves the utility's own personnel, which makes detecting and preventing the theft even more difficult.

Utilities are generally unable to determine and monitor the internal settings or configuration parameters of their meters without a utility employee being sent to each individual meter. Also, utilities are generally unable to store and access the internal settings or configuration parameters for each of their meters from a centralized location, such as a centralized database. Utilities also must send a utility employee to each individual meter in order to reprogram the meters to their default configuration parameters or to new configuration parameters. New configuration parameters may be required to implement changes to the costs of the commodity, seasonal changes, or new contractual agreements. However, if a utility employee must be sent to each meter in order to implement the changes to the meter's configuration parameters, the utility cannot prevent the employee from tampering with the configuration parameters on behalf of a consumer.

Some utilities (such as electrical and gas utilities) often make agreements with corporations having facilities that use large quantities of energy. For example, an electric utility can make an agreement with a corporation so that the corporation's facilities are required to use less power during peak times. Due to the agreement, more power is available for other consumers during peak times. The electric utility then sets the meters in the corporation's facilities according to a time-of-use schedule in order to implement the agreement. However, the corporation's employees or other individual may attempt to override the internal settings or configuration parameters of the meters in order to use more power during peak times (e.g., in order to increase the output of an air conditioning system, factory equipment, and the like). Before the meters in the corporation's facilities are read by a meter reader or an automatic meter reading (AMR) system, the corporation's employees can turn the meter back to the configuration parameters set by the electrical utility according to the agreement. Even though the electrical utility may be able to charge the corporation for the additional energy used in breach of the agreement, the energy will not be available to other consumers when needed during peak times.

In light of the problems and limitations described above, a need exists for a method and apparatus for remotely obtaining setting information of one or more meters, for detecting and preventing the theft of electricity, gas, water, and other commodities, for detecting meter tampering accomplished by changing the internal settings or configuration parameters of a meter, and for remotely changing one or more settings of a meter. A need also exists for detecting meter tampering quickly so that as little energy (or other commodity) as possible is lost or otherwise incorrectly measured. A further need exists for obtaining configuration parameters for meters and storing the configuration parameters in a centralized location. Each embodiment of the present invention achieves one or more of these results.

SUMMARY OF THE INVENTION

Some embodiments of the present invention provide a commodity meter management system including one or more commodity meters (e.g., electrical energy meters, gas meters, water meters, and the like), one or more servers, and a communications application to communicate between the meters and the servers. Each meter can initially be configured to operate according to one or more default configuration parameters, but at any given time, each meter operates according to actual configuration parameters, any of which can be different than the default configuration parameters. For energy meters, the configuration parameters can include transformer settings, scale factors, time-of-use or seasonal schedules, etc.

Each meter is preferably connected to at least one of several servers via any suitable communication medium. In some embodiments, each meter is connected to a server via one of several different types of communication mediums, and the meters are able to communicate with the servers over each of the different types of communication mediums simultaneously. For example, one meter can be connected to a server via a cellular network, while another meter can be connected to the same or another server in the system via a satellite network. In some embodiments, two or more meters can communicate simultaneously with the same server over the same or different networks. The servers are generally located remotely from the meters, such as at a utility's facility a distance from the customer. The communications application is used to communicate remotely between the meters and the servers. The communications application preferably enables bi-directional communication in real time between the meters and the servers. Preferably, the communications application can determine the actual configuration parameters according to which the meter is operating at any given time.

In some embodiments, the commodity meter management system includes a database connected to the servers. The database preferably stores default configuration parameters for one or more of the meters. In order to detect theft of the commodity, the communications application preferably compares the actual configuration parameters to the default configuration parameters. If the actual and default configuration parameters are not equal, substantially equal to or within a pre-determined threshold, the communications application preferably indicates that a tamper event has occurred. The communications application can also record that the tamper event has occurred and can create a tamper event message (such as in a tamper event log or history stored in a memory associated with the server) for use in preventing future thefts. The communications application can even take corrective action, such as to send a tamper event message to appropriate personnel who can be dispatched to check the meter.

In some embodiments, rather than dispatching personnel when a tamper event is indicated, the communications application resets the actual configuration parameters of the meter back to the default configuration parameters. Preferably, when the actual configuration parameters are reset to the default configuration parameters, the communications application records the time that the meter was reset and the location or identity of the meter so that theft activity can be tracked. In this matter, the theft can be quickly detected and further loss of the commodity can be prevented. In these and other embodiments, the communications application can change the actual configuration parameters to new configuration parameters, whether a tamper event has been indicated or not, thereby providing an amount of control over meter operations.

According to some methods of the invention, commodity meters are connected to one or more servers via a communication medium. The meters can be initially configured to operate according to one or more default configuration parameters preferably stored in a database. The servers communicate remotely with the meters in order to determine the actual configuration parameters according to which the meter is operating at any given time. Preferably, the actual and default configuration parameters are compared, (most preferably in real-time) and a tamper event is indicated if the actual and default configuration parameters are not equal to, substantially equal to, or within a predetermined threshold of one another. In some embodiments, when a tamper event is indicated, a tamper event message is created and used to dispatch personnel to check or service the meter. Also, in some embodiments the actual configuration parameter is automatically reset to the default configuration parameter. The time of the tamper event, the location of the meter being tampered with, and/or the identity of the meter tampered with can be recorded in order to track the theft activity. If desired, some embodiments of the present invention enable the actual configuration parameters to be changed to new configuration parameters.

Further objects and advantages of the present invention, together with the organization and manner of operation thereof, will become apparent from the following detailed description of the invention when taken in conjunction with the accompanying drawings, wherein like elements have like numerals throughout the drawings.

BRIEF DESCRIPTION OF THE DRAWINGS

The present invention is further described with reference to the accompanying drawings which show preferred embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numerals indicate like parts.

DETAILED DESCRIPTION OF THE PREFERRED EMBODIMENTS

Figure 1:
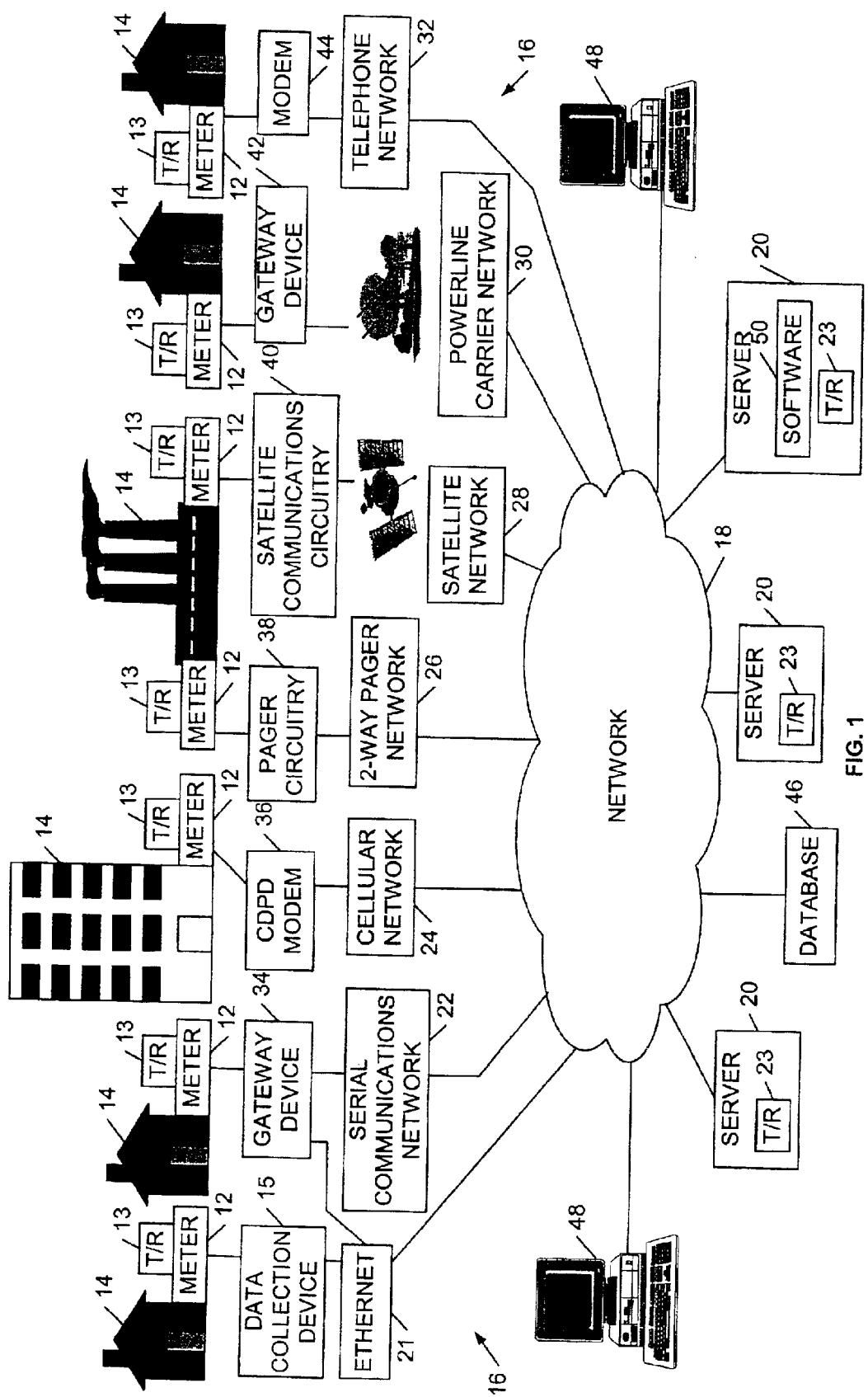
FIG. 1 illustrates a commodity meter management system according to a preferred embodiment of the present invention.

FIG. 1 illustrates a commodity meter management system 10 embodying the present invention. The system 10 includes commodity meters 12 connected to or otherwise associated with one or more buildings or properties 14 such as homes, businesses, and industrial plants. The meters 12 can be any device capable of measuring a commodity (i.e., any economic good) being consumed, such as electricity, water, gas, steam, telephone service, oil, gasoline, and the like. In some embodiments, the meters 12 are capable of bi-directional, real-time communication within the commodity meter management system 10. For example, each meter 12 can be equipped with one or more communication ports enabling such communications (such as USB, Ethernet, or other types of communications ports). As another example, each meter 12 can be equipped with a transceiver device 13. The transceiver device 13 can be any conventional device capable of providing or transmitting one or more signals by a wire or wireless connection or otherwise capable of sending signals to a communication medium. The transceiver device 13 could be, for example, hardware connected to a port of the meter 12 or a wireless transmitter device connected to the meter 12. However, in other embodiments described in greater detail below, the meters 12 are capable of communication that is not bi-directional or real-time. In such cases, the meters 12 could be equipped with only one of a transmitter or a receiver.

Several types of meters 12 can be used in the commodity meter management system 10. For example, for electrical energy, the meters 12 can include Ethernet-enabled power quality meters, standard revenue meters, IP revenue meters, or any other type of meter capable of measuring electrical energy. In some highly preferred embodiments, the meters 12 are solid-state meters that are equipped with one or more communication ports. If the solid-state meters do not include a communication port, the solid-state meters are preferably retrofitted with a gateway device, as will be described in more detail below, or a communication card (e.g., an Ethernet card, a two-way pager card, etc.).

To enable communication, one or more data collection devices 15 (i.e., a device that counts the pulses output by the meter 12) can also be connected to the meters 12. The data collection devices 15 are preferably equipped with communication capabilities. The data collection devices 15 are preferably configured to communicate with a server or with a remote computer. Communication with the server or remote computer can be via any conventional telecommunication medium, such as by an Ethernet connection as shown in FIG. 1, by a coaxial cable connection, or in by any other telecommunications lines or wireless transmissions as will be described in greater detail below. Although the data collection devices 15 (if used) can be located at or near a server 20 or remote computer 48, the data collection devices can instead be located at or near the location of the meters 12 or in another location between the meters 12 and the server 20 or remote computer 48.

Each data collection device 15 is preferably capable of storing at least some of the outputs of the meter or meters 12 connected thereto. In this regard, some data collection devices includes a real-time clock and are capable of transmitting the output of the meter 12 in real-time. In some embodiments, the data collection devices 15 include a memory and are capable of storing the output of connected meter(s) 12 for a period of time (e.g., an extended period of time such as 30 days of 15 or 30 minute interval readings) before transmitting the output of the connected meters 12 to the server 20 or remote computer 48. Also in some embodiments, the data collection devices 15 can convert analog or digital pulses or signals (e.g., dry-contact pulse outputs) generated by some meters 12 into digital signals suitable for transmission to the server 20 or remote computer 48 by any of the communications connections described above.

Additional information regarding such data collection devices 15 and their construction, connection, and manner of operation can be found in U.S. patent application Ser. No. 09/239,429 entitled "Energy Information and Control System," the disclosure of which is incorporated herein by reference, in so far as it relates to serial or Ethernet pulse input modules and other data collection devices and their construction, connection, and manner of operation.

Although one or more data collection devices 15 can be employed in the system 10 according to the present invention, in some embodiments the meter 12 is capable of direct communication with one or more servers 20 or remote computers 48 without the use of a data collection device 15. For example, the meters 12 can be Internet-protocol (IP) revenue meters that are capable of direct communication with networks using Internet protocol. Still other manners of connection and communication to servers 20 and/or remote computers 48 are possible, each of which fall within the spirit and scope of the present invention. A number of these alternative manners of connection and communication are described in greater detail below.

Each meter 12 preferably operates according to one or more internal settings or configuration parameters. The configuration parameters can include any internal settings or parameters that control the operation of the meter 12. Because configuration parameters can exist in a meter 12 in a number of different formats (e.g., digital, analog, etc.) and can be changed in an number of different manners, the term "configuration parameters" as used herein and in the appended claims also includes any signal representative of a setting of the meter 12 or capable of controlling the operation of the meter 12. For example, rather than transmitting an analog setting through the system 10, the analog setting can be converted into a digital signal that represents the analog setting of the configuration parameter. As another example, a configuration setting can be a trigger, a high or low voltage or current, an indicator, and the like, transmitted to change an internal setting of the meter 12. In many cases, several configuration parameters must be set for each meter 12 in order to accurately measure the amount of the commodity being consumed.

By way of example only, for electrical energy meters, the configuration parameters can include one or more of the following: potential transformer (PT) primary setting, PT secondary setting, PT ratio setting, current transformer (CT) primary setting, CT secondary setting, CT ratio setting, one or more scale factors, time-of-use schedules, season schedules, a demand reset, an energy reset, clock settings, an energy-per-pulse setting (i.e., kh), and a pulse-value setting (i.e., ke). Moreover, one of ordinary skill in the art will recognize that the configuration parameters for an electrical energy meter can include still other parameters according to which such meters 12 operate. Other commodity meter applications (e.g., for measuring gas, water, or any other commodity consumed) can employ other parameters, each of which are relevant to meter operation.

Instrument transformers, such as potential and current transformers (PTs and CTs), are typically used to measure the voltages and currents on a power line. Because these voltages and currents are very high, the voltages and currents must be converted into smaller, more manageable signals. Potential and current transformers have primary and secondary windings (i.e., coils of wire) that step the voltages and currents down to smaller signals. The meters 12 typically use multipliers (based upon the ratios of the primary to secondary windings) to convert the signals back to their actual values. If the primary settings, secondary settings, or ratio settings for the PT and/or CT are altered in the meter 12, the voltage and current measurements (and hence the energy consumption measurements) are also altered.

The scale factor parameters (in those meters having one or more of such parameters) are generally used to scale up or scale down the amount of energy the meter 12 measures per revolution of the meter's disk or per pulse output of the meter 12. A person could scale down the amount of the energy the meter measures per revolution or pulse in order to steal energy. In other types of meters where the commodity consumed is measured by the meter 12 in another manner, the scale factor can be used to scale up or scale down the weight given to each movement or other operation performed by the meter during commodity measurement. The meters 12 can also use general scale factors to increase or decrease a measured value to compensate for characteristics of the measuring devices.

If employed in the meter 12, time-of-use schedules are schedules for energy use agreed upon or decided by the consumer. For example, a consumer may agree to consume less energy during peak times in order to save on energy costs. A person could alter the time-of-use schedule to obtain more energy than agreed upon during peak times. Similarly, the season schedules (if employed) are schedules for the energy consumed for each season. For example, in the summer, the consumer could allow the building temperature to rise to 72 degrees before turning on the air-conditioning system, while in the winter, the consumer could allow the building temperature to fall to 68 degrees before turning on the heating system. A person could alter the season schedules to obtain more energy than agreed upon. Similar time-of-use and seasonal schedules can be employed in other types of commodity meters, each of which are relevant to some embodiments of the present invention.

A commodity such as electrical energy is typically more expensive during one time-of-use period or season. A person could alter the time-of-use or seasonal schedules within the meter 12 to reduce the amount of the commodity being measured during the more expensive period. For example, if a peak period for electrical energy is from 12:00–5:00 p.m., the meter 12 records the energy measured during that time period in a "peak period" category. If a person changes the configuration parameters so that the peak period for the meter 12 is from 1:00–4:00 p.m., the meter 12 will record the energy measured from 12:00–1:00 p.m. and from 4:00–5:00 p.m. in a "off-peak period" category. Thus, the consumer will pay lower off-peak rates for peak-period energy.

Some meters 12 are provided with demand and energy resets corresponding to demand and energy registers. The meter reader or an automatic meter reading (AMR) system uses such resets to reset the meter 12 after making a periodic reading of the demand and energy registers. For example, an AMR system can read the meter 12 once per month and can use the demand and energy resets to reset the demand and energy registers after each reading. A person could use the demand and energy resets to clear the quantities already measured for the billing period before the end of the billing period in order to steal energy. Similarly, the configuration parameters could also include energy-billing configuration parameters, and a person could alter energy-billing configuration parameters for a current billing period in order to steal energy. As with the other operational parameters of the meter described above, similar resets can be found on other types of commodity meters, each of which are relevant to alternative embodiments of the present invention.

In addition to resetting the demand and energy registers to zero, the registers can be set to a value lower than the actual consumption value. For example, commodities such as electrical energy, gas, and water, are often measured with ever increasing values. The difference between the measurement for the current month and the measurement for the previous month represents the amount of the commodity consumed in the billing period. Using a gas meter as an example, if the gas measurement for the previous month was 10,000 MCF (thousand cubic feet) and the gas measurement for the current month is 11,000 MCF, the gas consumption value is 1,000 MCF. However, if the meter reads 10,500 MCF at mid-month, and a person changes the register back to 10,100 MCF, the register will read 10,600 MCF at the end of the month and 400 MCF of gas will be stolen. Also, the demand registers record the peak value for a particular time period. Since consumers are often billed based on their peak-period demand, a person can steal energy by changing the demand register to a smaller value.

Where employed, the clock settings of an electricity meter (or another commodity meter) include the time and date settings that are maintained internally in each meter 12. A person could alter the time and date settings in order to change the timing of the billing period and to steal energy or another commodity measured by the meter 12.

The energy-per-pulse setting (kh) represents the quantity of energy measured by the meter 12 per each rotation of the meter's disk or per each pulse of the meter 12. The pulse-value setting (ke) is the quantity of energy measured for each rotation or pulse. A person could decrease the energy-per-pulse setting and/or the pulse-value setting in order to steal energy. Like the scale factor parameters described above, in other types of meters where the commodity consumed is measured by the meter 12 in another manner, such settings can be employed to set the quantity of commodity measured by the meter 12 for each movement or other operation performed by the meter 12.

Gas meters and water meters use measuring devices such as valves and/or drums to convert the flow of gas or water into a signal that is then converted back into a gas or water consumption value. Scale factors analogous to the PT and CT ratios described above are used to convert the signals into actual consumption values. The scale factors are properties of the gas or water measuring devices. In order to determine the actual consumption values, the ratios that are programmed into the meters must match the scale factor properties of the measuring devices. Thus, a person could alter the scale factors and/or ratios that are programmed into the meters in order to steal gas or water.

In some preferred embodiments of the present invention, each meter 12 is connected via one or more communication mediums 16 to a network 18 connected to one or more servers 20. In other embodiments, each meter 12 is instead directly connected to one or more servers 20 or remote computers 48. By way of example only, the system 10 illustrated in FIG. 1 and described elsewhere herein has a network 18 to which the meters 12 and the servers 20 and/or remote computers 48 are connected. Each meter 12 is connected to the network 18 (or directly to one or more servers 20 or remote computers 48 in other embodiments) via a communication medium 16. In some cases, one or more of the meters 12 can be connected in this manner via more than one communication medium 16 to provide redundancy in the event that one communication medium 16 is temporarily unable to communicate with the network 18. Referring again to the embodiment illustrated in FIG. 1, the communication mediums 16 can be separate devices, systems, or networks or can be integral with the network 18.

In some embodiments, each server 20 is equipped with a transceiver device 23. The transceiver device 23 can be any conventional device capable of providing or transmitting one or more signals by a wire or wireless connection or otherwise capable of sending signals via the communication mediums 16. The transceiver device 23 could be, for example, hardware connected to a port of the server 20 or a wireless transmitter device connected to the server 20. However, in other embodiments described in greater detail below, each server 20 is capable of communication that is not bi-directional or real-time. In such cases, each server 20 could be equipped with only one of a transmitter or a receiver.

The communication mediums 16 can be any suitable communication system, device, or network. For example, the communication mediums 16 can include an Ethernet connection 21, a serial-communications network 22, a cellular network 24, a two-way pager network 26, a satellite network 28, a power-line carrier network 30, and/or a telephone network 32, and any combination thereof. Still other types of communication mediums 16 are possible and fall within the spirit and scope of the present invention. The network 18 can be any packet-switched network (i.e., the Internet or an intranet), a local-area network (LAN), a wide-area network (WAN), a virtual private network (VPN), or any combination thereof. For example, the network 18 can be comprised of the Internet connected to a LAN that is connected to the servers 20 or remote computers 48. One having ordinary skill in the art will appreciate that other types of communications networks can be used to enable communication between the meters 12 and the servers 20 or remote computers 48, each of which falls within the spirit and scope of the present invention. In some highly preferred embodiments, the network 18 operates according to transmission control protocol/Internet protocol (TCP/IP), although any other communications protocol can be employed as desired. For example, the network 18 can operate according to asynchronous transfer mode (ATM) and/or user datagram protocol/Internet protocol (UDP/IP).

Additional information regarding such communication mediums 16, networks 18, and servers 20, and their construction, connection, and manner of operation can be found in U.S. patent application Ser. No. 09/239,429 entitled "Energy Information and Control System," and U.S. patent application Ser. No. 10/038,057 entitled "Infinitely Scalable Method for Acquiring Data Over a Computer Network," the disclosures of which are incorporated herein by reference, in so far as they relate to building servers, primary servers, power databases and other communication mediums, networks, and servers, and their construction, connection, and manner of operation.

With continued reference to the embodiment of the present invention illustrated in FIG. 1, the meters 12 can be connected to the network 18 via the serial communications network 22. In such cases, the meters 12 can be connected to the serial communications network 22 via one or more serial connections (e.g., serial ports with selectable RS-232/422/485), and can thereafter be connected to the network 18 in a number of different manners, such as via a gateway device 34. In those cases where this connection is to a non-serial network 18, the gateway device 34 can be any hardware device capable of serving as a bridge between a serial communications-enabled device and a non-serial network. Alternatively, the gateway device 34 can be connected to the network 18 via an Ethernet connection 21 or any other communication medium 16 described herein. In addition to the meters 12, the gateway device 34 can be used to connect other devices to the network 18 or directly to the servers 20 or remote computers 48, such as power monitors, HVAC equipment, circuit breakers, generators, uninterruptible power supplies (UPS), programmable controllers, and/or any type of analog and/or digital input/outputs. Once connected to the gateway device 34, the data stored within these other devices can preferably be shared, distributed, and accessed by other devices connected to the network 18. For example, if the HVAC equipment for a building is connected to the network 18, the data regarding the power consumed by the HVAC equipment can be accessed by a utility client.

Additional information regarding such gateway devices, and their construction, connection, and manner of operation can be found in U.S. patent application Ser. No. 09/239,429 entitled "Energy Information and Control System," the disclosure of which is incorporated herein by reference, in so far as it relates to building servers and other gateway devices, and their construction, connection, and manner of operation.

The meters 12 can also or instead be connected to the network 18 or directly to one or more servers 20 or remote computers 48 via a cellular network 24. The meters 12 can be connected to the cellular network 24 via cellular-digital-packet-data (CDPD) modems 36 or other conventional hardware enabling communication via a cellular network 24. In some preferred embodiments, each meter 12 using the cellular network 24 is equipped with or connected to the cellular network 24 by a CDPD modem 36.

The meters 12 can also or instead be connected to the network 18 or directly to one or more servers 20 or remote computers 48 via a two-way pager network 26. The meters 12 can be connected to the two-way pager network 26 via pager circuitry 38. In some embodiments, each meter 12 using the two-way pager network 26 is equipped with or is connected to the two-way pager network 26 by such pager circuitry 38. Preferably, the two-way pager network 26 utilizes a telecommunications company's pager network to send and/or receive information regarding the meters 12. In some embodiments, the servers 20 or remote computers 48 in turn can communicate with the telecommunications company's network infrastructure to bridge onto the two-way pager network 26.

The meters 12 can also or instead be connected to the network 18 or directly to one or more servers 20 or remote computers 48 via a satellite network 28. In some embodiments, the satellite network 28 is comprised of one or more low-earth-orbit (LEO) satellite networks. The meters 12 can be connected to the satellite network 28 via satellite communications circuitry 40. In some embodiments, each meter 12 using the satellite network 28 is equipped with or is connected to the satellite network 28 by such satellite communications circuitry 40.

The meters 12 can also or instead be connected to the network 18 or directly to one or more servers 20 or remote computers 48 via a power-line carrier network 30. In the power-line carrier network 30, electric power lines are preferably used as a communication medium. The electric power lines often have a limited geographical range, so gateway devices 42 (e.g., devices similar in function to the gateway devices 34 described above) can be used (if desired) to bridge signals between the power-line carrier network 30 and other networks of the communication mediums 16.

The meters 12 can also or instead be connected to the network 18 or directly to one or more servers 20 or remote computers 48 via a telephone network 32. The meters 12 can be connected to the telephone network 32 in any conventional manner, such as by suitable wire or cable or by internal or external modems 44 connected to the meters 12. In some embodiments, each meter 12 using the telephone network 32 is preferably equipped with or is connected to the telephone network 32 by a modem 44. Preferably, the modems 44 use telephone lines to communicate with the network 18, servers 20, and/or remote computers 48. Any manner of conventional telephone connection can be employed for this purpose. For example, the modems 44 can communicate with the network 18 by contacting an Internet service provider (ISP) and bridging onto a LAN or WAN connected to the network 18, servers 20, or remote computers 48. As another example, the modems 44 can communicate directly with one or more servers 20 or remote computers 48 by communicating with a modem bank connected to the servers 20 or remote computers 48.

Preferably, for each of the communication mediums 16, the devices connected to the network 18 (e.g., gateway devices, communication cards in the meters, circuitry connected to the meters, communications-equipped meters, etc.) are programmed with communications parameters. These communications parameters would be understood by one of ordinary skill in the art, and can include Internet protocol addresses, phone numbers, serial numbers, etc. These communications parameters server to bridge the meters 12 and/or gateway devices 34 or 42 onto communications networks so that the servers 20 (or any other device or computer connected to the network 18) can locate and access the meters 12 and/or gateway devices 34 or 42.

In some embodiments of the present invention, a database 46 is connected to the network 18 or is connected to one or more of the servers 20 or remote computers 48 in any other manner. The database 46 can store information regarding the operation of each meter 12, the location of each meter 12, the identity of each meter 12, and any other necessary information regarding each meter 12. Alternatively, such information regarding only some of the meters 12 can be stored on the database 46. Preferably, the servers 20 or remote computers 48 communicate with the database 46 in order to access the information regarding the meters 12. The database 46 is preferably also used to store one or more default configuration parameters for some or all of the meters 12. The default configuration parameters can be any of the configuration parameters discussed above with respect to electric, water, gas, and other meters, or any other suitable configuration parameter for a meter. The default configuration parameters are the configuration parameters initially programmed into the meter 12 or otherwise set for the meter 12, either when the meter 12 is first installed or when the meter 12 is programmed or otherwise set for the particular consumer or manner of operation. The default configuration parameters can include configuration parameters necessary for the proper operation of the meter 12, and can also or instead include configuration parameters agreed upon by the consumer, such as time-of-use or season schedules. The database 46 can also be used to store one or more actual configuration parameters for one or more of the meters 12, and the manner in which this information can be obtained and stored in the database 46 is described in greater detail below.

As described above, one of more computers 48 are preferably connected to the network 18. The computers 48 can be computers or computer systems of the utility providing the commodity measured by the meters 12. In this regard, the computers 48 can also include computers and computer systems of individual utility clients or groups of utility clients. The utilities and/or utility clients (in different embodiments of the present invention) are preferably able to communicate with the servers 20 and the database 46 in order to access information regarding operation of the meters 12, meter default configuration parameters, meter actual configuration parameters, and any other necessary information regarding the meters 12. Examples of such configuration parameters are described in greater detail above with regard to electric meters. Any or all of these types of information can be accessible to the utilities and/or utility clients.

For example, the utility clients are preferably able to access information regarding particular meters 12 that are being tampered with. Rather than (or in addition to) client computers 48 being directly connected to the network 18, the commodity meter management system 10 can generate and send reports of meter tampering (or any other information regarding the meters 12) to the utility clients. As other examples, a utility can access a history of theft events associated with one or more of the meters 12 and stored in the database, can view information regarding the default, actual, or default and actual configuration parameters for one or more of the meters 12, can view which configuration parameters have been changed for any or all of the meters 12 over a given period of time, or can identify which meters 12 have been subject to changes of a certain configuration parameter, and the like. Still other information regarding the actual and default configuration parameters of one or more meters 12 in the system 10 can preferably be accessed by the remote computer(s) 48. Preferably, the present invention enables a user (such as a utility client or a system administrator not employed by the utility) of the system 10 to access the database via a computer 48 or server 20 to view one or more default and/or actual configuration parameters of one or more meters 12 in the system 10. In alternative embodiments of the present invention, the database 46 is associated with a computer 48 of a utility or with a computer 48 of a utility client, such as in the case of a memory of either computer 48.

In some embodiments, the commodity meter management system 10 is configured for use by one utility client, such as a single electrical utility, and only electric meters 12 are managed. In other embodiments, the commodity meter management system 20 is used to manage several different types of commodity meters 12 for one or more utility clients. For example, the commodity meter management system 10 can be used to manage electric, gas, and water meters for one or more utility clients in order to manage all of the public utility meters for a given geographic area or for a given consumer or group of consumers.

A communications application preferably comprised of software 50 is stored and executed from one or more of the servers 20 (which can be a server of the utility or commodity supplier, a server of the customer, or a server of a third party). Alternatively, the communications application can be stored and executed from one or more of the remote computers 48. In general, the software 50 could be stored and executed from any one of the meters 12, the network 18, the server(s) 20, the remote computers 48, or on any combination of these devices and systems. Although the communications application is described as being comprised of software 50, the communications application can also be comprised of hardware or a combination of software and hardware.

Additional information regarding such communications application software 50 and its construction, connection, and manner of operation can be found in U.S. patent application Ser. No. 09/239,429 entitled "Energy Information and Control System," and U.S. patent application Ser. No. 10/038, 057 entitled "Infinitely Scalable Method for Acquiring Data Over a Computer Network," the disclosures of which are incorporated herein by reference, in so far as they relate to data acquisition systems and other communications application software, and their construction, connection, and manner of operation.

Figure 2A:
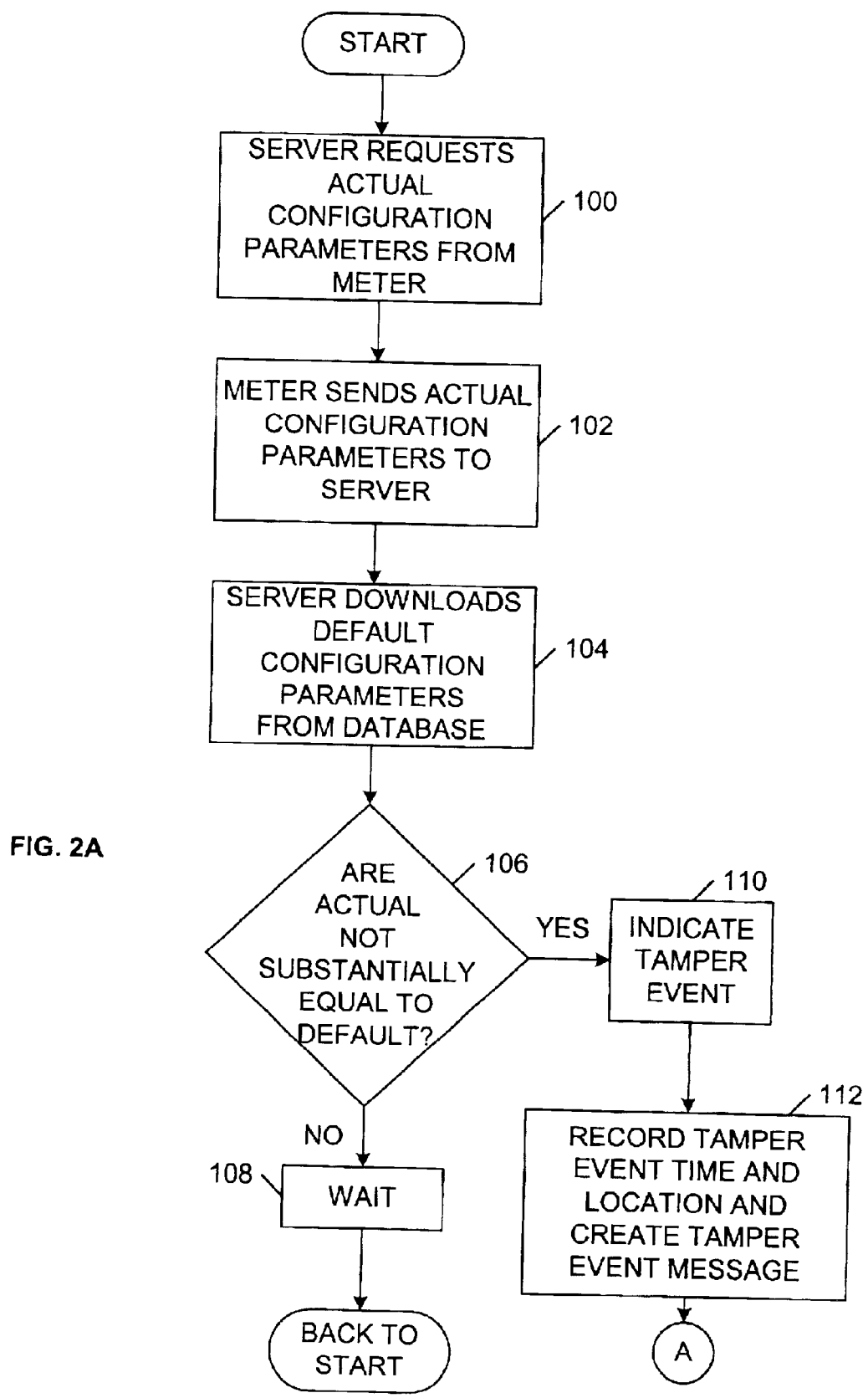
FIGS. 2A and 2B are a flow chart illustrating an embodiment of a method according to the present invention.
Figure 2B:
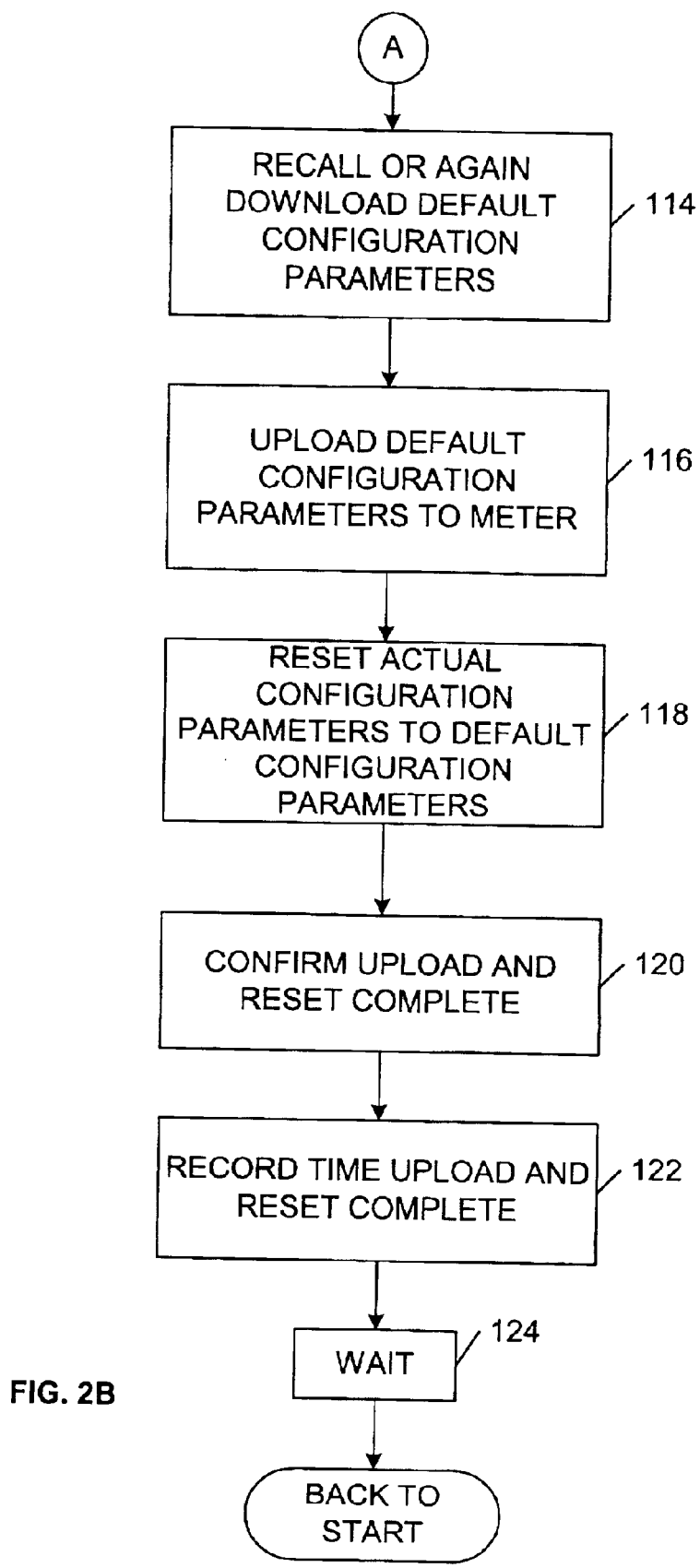

The communications application software 50 is preferably programmed to operate according to the method of the invention as described below. As shown in FIGS. 2A and 2B, the commodity meter management system 10 can be operated according to a "pull" software architecture in which one or more of the servers 20 or remote computers 48 request information from the meters 12. For ease of description, only a system in which one or more servers 20 perform meter information gathering will be described below, it being understood that similar methods can be performed in the case of one or more remote computers 48 performing the tasks of the servers 20 described below. According to the "pull" software architecture, the server 20 preferably initiates communication with the meter 12 by requesting information from the meter 12 at predetermined intervals, such as every 15 or 30 minutes, once every day, and the like. However, the server 20 can also request information from the meter 12 whenever necessary, such as at scheduled times or dates, when a utility client suspects meter tampering by a particular consumer, and the like.

As shown in FIG. 2A, the server 20 preferably requests (at 100) from the meter 12 one or more actual configuration parameters under which the meter 12 is currently operating. The meter 12 preferably sends (at 102) the actual configuration parameters to the server 20 via one or more of the communication mediums 16 and the network 18 (in embodiments of the present invention employing a network). Alternatively, the meter 12 can send (at 102) the actual configuration parameters to the network 18 directly (in the case where the network 18 is defined by a system connected directly to the meter 12) or even to the server 20 directly.

Preferably, the server 20 downloads (at 104) one or more default configuration parameters for the meter 12 from the database 46.

The communications application software 50 then preferably compares (at 106) one or more of the actual configuration parameters to one or more of the corresponding default configuration parameters for the meter 12. In some preferred embodiments, the communications application software 50 performs this comparison in real-time as the actual configuration parameters are sent by the meter 12. If one or more of the actual configuration parameters are equal to, substantially equal to, or within a predetermined threshold of the default configuration parameters (preferably set and adjustable by the utility), the communications application software 50 preferably waits (at 108) for a time period corresponding to a predetermined time interval before requesting the actual configuration parameters from the meter 12 again. Alternatively, the communications application software 50 can wait until the next scheduled time to request the actual configuration parameters or can wait for a user command to request the actual configuration parameters. If a predetermined threshold is employed in the determination made at 108, the predetermined threshold can correspond to the accuracy of the equipment or to any other accuracy, calibration, or tolerance considerations. The predetermined threshold could also correspond to a de minimus level of theft that the utility client has decided not to pursue.

If the actual configuration parameters are not equal to, substantially equal to, or within a predetermined threshold of the default configuration parameters, the communications application software 50 preferably indicates (at 110) that a tamper event has occurred. When a tamper event is indicated, the communications application software 50 preferably records (at 112) information regarding the tamper event, such as the date, time, and location of the tamper event. This information is preferably recorded in the database 46, but could instead or in addition be recorded in a memory associated with any one or more of the servers 20 or remote computers 48. In some preferred embodiments, the communications application software 50 is capable of recording the specific location and/or identity of the meter 12 that is being tampered with, so that the meter tampering activity can be tracked more easily. For example, by recording the location and/or identity of the meter 12, the meter tampering activity can be associated with one or more utility employees working in a particular geographic area at the time of the tamper event.

In addition to or rather than recording the tamper event date, time, location, or meter identity, the communications application software 50 can create (at 112) a tamper event message. The tamper event message can include any of the tamper information just described, as well as the particular configuration parameter or parameters being altered in the meter 12, and any other necessary information. The tamper event message can be used for any number of purposes, such as for dispatching personnel to the location of the meter 12 being tampered with in order to manually reset or otherwise service the meter 12, to apprehend the person(s) tampering with the meter 12, and the like.

In some embodiments of the present invention, the communications application software can take other corrective action instead of or in addition to preparing, displaying and/or sending a tamper event message as just described. As shown in FIG. 2B, when a tamper event is indicated, the communications application software 50 can preferably either recall or again download (at 114) the default configuration parameter(s) for the meter 12 from the database 46. In some embodiments, the communications application software 50 is capable of resetting the meter 12 to again operate according to the default configuration parameters. In such cases, the communications application software 50 preferably sends one or more signals to the tampered meter 12 corresponding to the correct default configuration parameter(s) to be followed by the meter 12 or to trigger a reset function in the meter 12 in order to restore default configuration parameter(s) stored in a memory of the meter 12. In some embodiments, the communications application software 50 is also capable of changing one or more actual configuration parameters or default configuration parameters of the meter 12 to new configuration parameters (i.e., parameters different from the default configuration parameters). For example, if the consumer agrees to a new time-of-use schedule, the new configuration parameters can be uploaded to the meter 12 in order to implement the new time-of-use schedule. In various embodiments of the present invention, any one or more configuration parameters of the meter 12 can be controlled and adjusted remotely in this manner.

In order to reset the meter 12 to the default configuration parameters (or to the new configuration parameters), the communications application software 50 preferably uploads (at 116) the default or new configuration parameters from the server 20 to the meter 12 via the communication medium 16 connected to the meter 12. The communications application software 50 then resets (at 118) the actual or default configuration parameters according to which the meter 12 is currently operating back to the default configuration parameters (or to the new configuration parameters). In some embodiments, the communications application software 50 can also confirm (at 120) that the default configuration parameters (or new configuration parameters) were successfully uploaded and/or that the resetting of the meter 12 is complete. Also in some embodiments, the communications application software 50 preferably records (at 122) the time and/or date when meter 12 has been reset for billing purposes or for any other purpose. This information can be recorded in the database 46 or in a memory associated with a server 20, a remote computer 48, or even the meter 12. The communications application software 50 preferably waits (at 124) for a time period corresponding to a predetermined interval before requesting the actual configuration parameters from the meter 12 again, or waits for a scheduled time or command from a user for the same purpose.

Figure 3A:
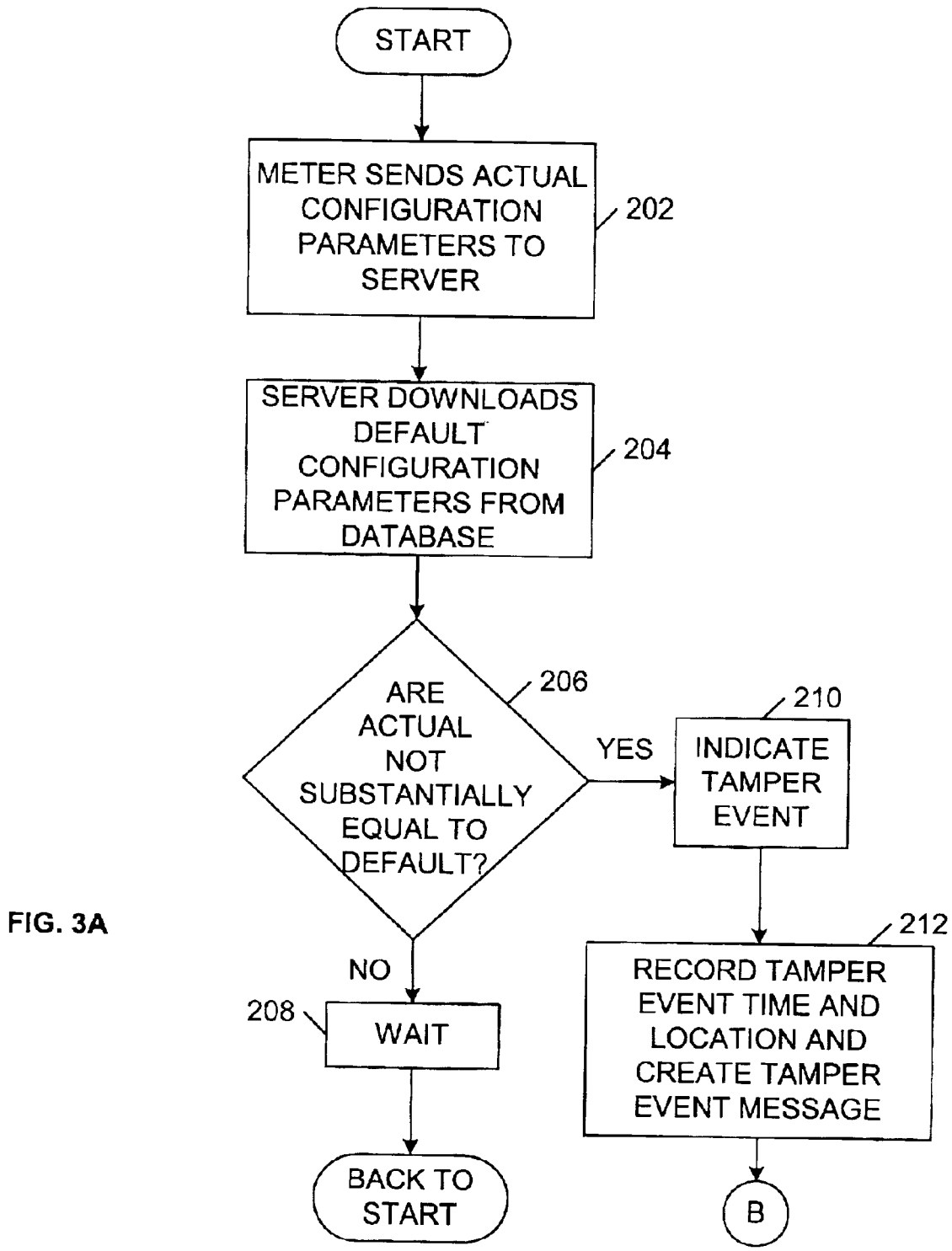
FIGS. 3A and 3B are a flow chart illustrating another embodiment of a method according to the present invention.
Figure 3B:
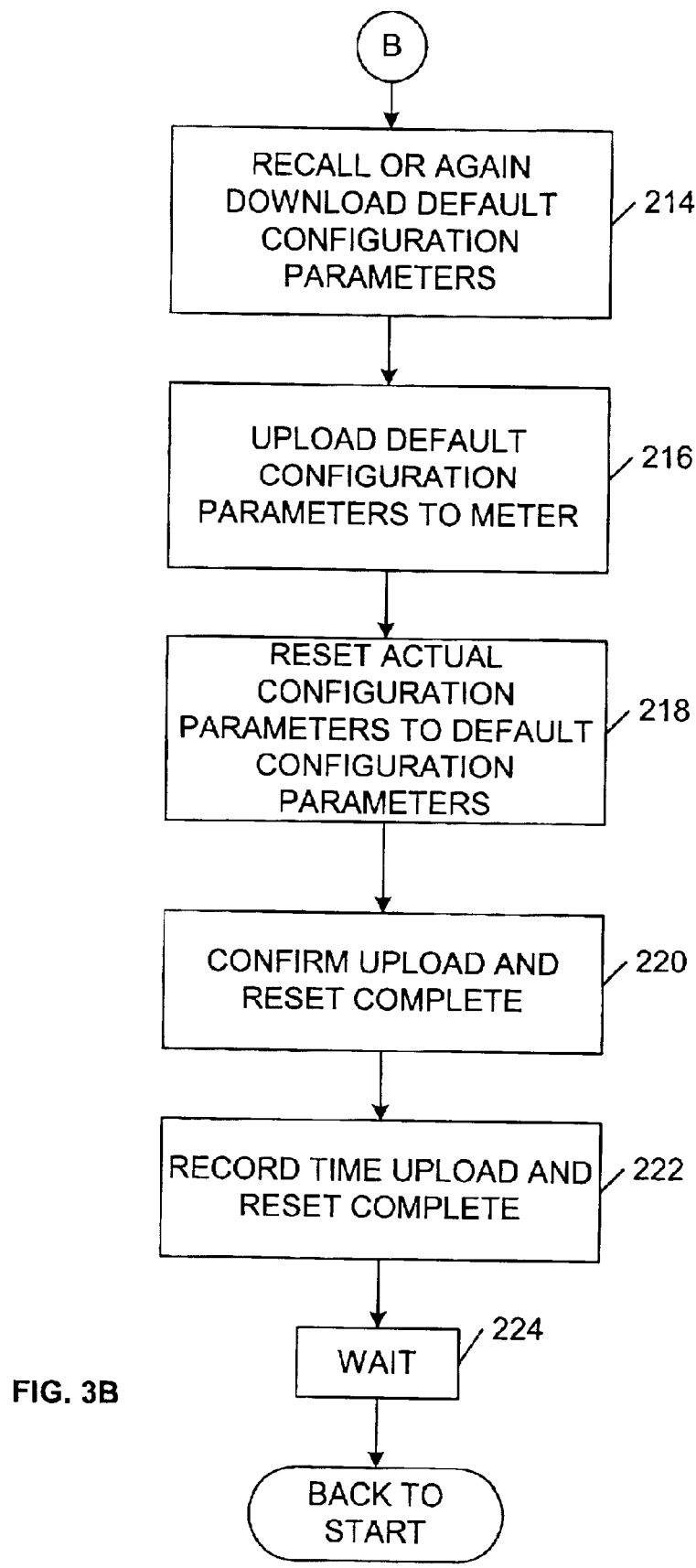

As shown in FIGS. 3A and 3B, some embodiments of the commodity meter management system 10 according to the present invention are operated according to a "push" software architecture in which the meters 12 (or the gateways devices 34 and 42) provide information to one or more servers 20 or remote computers 48, without the servers 20 or remote computers having to request the information. For ease of description, only a system in which one or more servers 20 respond to information provided by a meter will be described below, it being understood that similar methods can be performed in the case of one or more remote computers 48 responding in such manners. According to the "push" software architecture, the meter 12 preferably initiates communication with the server 20 by automatically providing information to the server 20 at predetermined intervals, such as every 15 or 30 minutes, once every day, and the like. Alternatively, the meter 12 can initiate such communication at set times and dates, when a meter configuration parameter has been changed (by tampering or otherwise), and the like.

The meter 12 preferably sends (at 202) one or more actual configuration parameters to the server 20 via one or more of the communication mediums 16 and the network 18 (in embodiments of the present invention employing a network 18). Alternatively, the meter 12 can send the actual configuration parameters to the network 18 directly (in the case where the network 18 is defined by a system connected directly to the meter 12) or even to the server 20 directly. Preferably, the server 20 downloads (at 204) one or more default configuration parameters for the meter 12 from the database 46.

The communications application software 50 then preferably compares (at 206) one or more of the actual configuration parameters to one or more of the corresponding default configuration parameters for the meter 12. In some preferred embodiments, the communications application software 50 performs the comparison in real-time as the actual configuration parameters are sent by the meter 12. If one or more of the actual configuration parameters are equal to, substantially equal to, or within a predetermined threshold of the default configuration parameters (preferably set and adjustable by the utility), the communications application software 50 preferably waits (at 208) for a time period corresponding to a predetermined time interval before requesting the actual configuration parameters from the meter 12 again. The predetermined threshold can correspond to the accuracy of the equipment or to any other accuracy, calibration, or tolerance considerations. The predetermined threshold could also correspond to a de minimus level of theft that the utility client has decided not to pursue.

If the actual configuration parameters are not equal to, substantially equal to, or within a predetermined threshold of the default configuration parameters, the communications application software 50 indicates (at 210) that a tamper event has occurred. When a tamper event is indicated, the communications application software 50 preferably records (at 212) information regarding the tamper event, such as the date, time, and location of the tamper event. This information is preferably recorded in the database 46, but could instead or in addition be recorded in a memory associated with any one or more of the servers 20 or remote computers 48. In some preferred embodiments, the communications application software 50 is capable of recording the specific location and/or identity of the meter 12 that is being tampered with, so that the meter tampering activity can be tracked more easily. For example, by recording the location and/or identity of the meter 12, the meter tampering activity can be associated with one or more utility employees working in a particular geographic area at the time of the indicated tamper event.

In addition to or rather than recording the tamper event date, time, location, or meter identity, the communications application software 50 can creates (at 212) a tamper event message. The tamper event message can include any of the tamper information just described, as well as the particular configuration parameter or parameters being altered in the meter 12, and any other necessary information. The tamper event message can be used for any number of purposes, such as for dispatching personnel to the location of the meter 12 being tampered with in order to manually reset or otherwise service the meter 12, to apprehend the person(s) tampering with the meter 12, and the like.

In some embodiments of the present invention, the communications application software can take other corrective action instead of or in addition to preparing, displaying and/or sending a tamper event message as just described. As shown in FIG. 3B, when a tamper event is indicated, the communications application software 50 can preferably either recall or again download (at 214) the default configuration parameter(s) for the meter 12 from the database 46. In some embodiments, the communications application software 50 is capable of resetting the meter 12 to again operate according to the default configuration parameters. In such cases, the communications application software 50 preferably sends one or more signals to the tampered meter 12 corresponding to the correct default configuration parameter(s) to be followed by the meter 12 or to trigger a reset function in the meter 12 in order to restore default configuration parameter(s) stored in a memory of the meter 12. In some embodiments, the communications application software 50 is also capable of changing one or more actual configuration parameters or default configuration parameters of the meter 12 to new configuration parameters (i.e., parameters different from the default configuration parameters). For example, if the consumer agrees to a new time-of-use schedule, the new configuration parameters can be uploaded to the meter 12 in order to implement the new time-of-use schedule. In various embodiments of the present invention, any one or more configuration parameters of the meter 12 can be controlled and adjusted remotely in this manner.

In order to reset the meter 12 to the default configuration parameters (or to the new configuration parameters), the communications application software 50 preferably uploads (at 216) the default or new configuration parameters from the server 20 to the meter 12 via the communication medium 16 connected to the meter 12. The communications application software 50 then resets (at 218) the actual or default configuration parameters according to which the meter 12 is currently operating back to the default configuration parameters (or to the new configuration parameters). In some embodiments, the communications application software 50 can also confirm (at 220) that the default configuration parameters (or new configuration parameters) were successfully uploaded and/or that the resetting of the meter 12 is complete. Also in some embodiments, the communications application software 50 preferably records (at 222) the time and/or date when meter 12 has been reset for billing purposes or for any other purpose. This information can be recorded in the database 46 or in a memory associated with a server 20, a remote computer 48, or even the meter. The meter 12 preferably waits (at 224) for a time period or for a following schedule time before sending the actual configuration parameters to the server 20 again.

In some embodiments of the present invention, the commodity meter management system 10 can also operate according to both the "pull" and "push" software architectures described above. For example, some meters 12 can be programmed or otherwise set to automatically send one or more of their actual configuration parameters to the servers 20, while other meters 12 can be programmed or otherwise set to wait for a request from the servers 20 before sending their actual configuration parameters. Regardless of whether the "pull" and/or "push" software architectures are used, the commodity meter management system 10 in some highly preferred embodiments is capable of bi-directional real-time communication via each of the communication mediums 16 simultaneously.

It should also be understood that non-bi-directional embodiments of the commodity meter management system 10 are possible. For example, the server 20 can automatically send out signals to reset the connected meters 12 at regular or scheduled intervals (i.e., one-directional communication from the servers 20 to the meters 12). As another example, the meters 12 could automatically send the actual configuration parameters or a tamper event indication to the servers 20 without being prompted (i.e., one-directional communication from the meters 12 to the servers 20), after which time utility personnel could be dispatched to manually reset the necessary meters 12.

It should be understood that the invention is not limited to detecting and preventing meter tampering. Rather, the invention can be employed to remotely monitor the internal settings or configuration parameters of the meters 12 (without further capabilities), to automatically or manually remotely trigger a resetting of the configuration parameters (without being able to view or determine what the configuration settings are), to remotely change the configuration parameters to other desired configuration parameters (without any other capabilities), etc. Thus, the capabilities of the commodity meter management system 10 can merely relate to the more efficient management of commodity meters 12.

It will be appreciated by those of ordinary skill in the art that the method of the invention as shown in FIGS. 2A–3B can involve processes or functions which operate simultaneously in some instances, consecutively in some instances, and repetitively in some instances. In other words, various aspects of the present invention can operate independently from one another, as well as in reaction to changing characteristics associated with the commodity meter management system 10. As a result, no one flow chart moving from a single beginning point to a single end point can completely define the scope of the present invention.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

It should be noted that as used in the appended claims, the term "server" is intended to encompass computers and computer systems that are either stand-alone (i.e., the remote computer 48) or are used to serve other computers (i.e., the server 20).

We claim:

1. A commodity meter management system, comprising:
   a commodity meter operating according to an actual configuration parameter;
   a server located remotely from the commodity meter;
   a communication medium coupled to the commodity meter and to the server;
   a transmitter coupled to the commodity meter to transmit the actual configuration parameter of the commodity meter to the server via the communication medium;
   a receiver coupled to the server to receive the actual configuration parameter from the commodity meter via the communication medium;
   a database coupled to the server, the database storing a default configuration parameter for the commodity meter; and
   an application adapted to compare the default configuration parameter with the actual configuration parameter;
   the application being further adapted to reset the actual configuration parameter of the commodity meter to the default parameter of the commodity meter;
   the application being further adapted to record information regarding resetting of the actual configuration parameter to the default configuration parameter.

2. The commodity meter management system as claimed in claim 1, further comprising:
   a transmitter coupled to the server to transmit a new configuration parameter to the commodity meter via the communication medium; and
   a receiver coupled to the commodity meter to receive the new configuration parameter from the server via the communication medium.

3. The commodity meter management system as claimed in claim 2, further comprising a communications application enabling bi-directional real-time communication between the commodity meter and the server.

4. The commodity meter management system as claimed in claim 2, wherein the transmitter coupled to the commodity meter and the receiver coupled to the commodity meter comprise a transceiver device.

5. The commodity meter management system as claimed in claim 2, wherein the transmitter coupled to the server and the receiver coupled to the server comprise a transceiver device.

6. The commodity meter management system as claimed in claim 1, further comprising:
   at least one additional commodity meter coupled to the server via a second communication medium, each additional commodity meter operating according to a respective actual configuration parameter; and
   a transmitter coupled to each of the at least one additional commodity meters to transmit the respective actual configuration parameters to the server via the second communication medium.

7. The commodity meter management system as claimed in claim 1, further comprising:
   at least one additional commodity meter coupled to the server via a second communication medium, each additional commodity meter operating according to a respective actual configuration parameter; and
   a receiver coupled to each of the at least one additional commodity meters to receive new configuration parameters from the server via the second communication medium.

8. The commodity meter management system as claimed in claim 1, wherein the application is capable of real-time comparison of the default configuration to the actual configuration parameter.

9. The commodity meter management system as claimed in claim 1, wherein the information includes at least one of a date and commodity meter identification information.

10. The commodity meter management system as claimed in claim 1, wherein the application is further adapted to generate at least one message responsive to detection of a default configuration parameter that is different than an actual configuration parameter.

11. A commodity meter management system, comprising:
   a commodity meter operating according to an actual configuration parameter;
   a server located remotely from the commodity meter;
   a communication medium coupled to the commodity meter and to the server;
   a transmitter coupled to the commodity meter to transmit the actual configuration parameter of the commodity meter to the server via the communication medium;
   a receiver coupled to the server to receive the actual configuration parameter from the commodity meter via the communication medium;
   a database coupled to the server, the database storing a new configuration parameter for the commodity meter; and an application adapted to reset the actual configuration parameter of the commodity meter to the new configuration parameter;

the application being further adapted to record information regarding resetting of the actual configuration parameter to the new configuration parameter.

12. The commodity meter management system as claimed in claim 11, wherein the communication medium is at least one of a packet-switched network, a serial communications network, a cellular digital packet data modem network, a two-way pager network, a satellite network, a power line carrier network, and a telephone network.

13. The commodity meter management system as claimed in claim 11, wherein the commodity meter is an energy meter.

14. The commodity meter management system as claimed in claim 11, wherein the actual configuration parameter is at least one of a potential transformer primary setting, a potential transformer secondary setting, a potential transformer ratio setting, a current transformer primary setting, a current transformer secondary setting, a current transformer ratio setting, a scale factor, a time-of-use schedule, a season schedule, a demand reset, an energy reset, a clock setting, an energy-per-pulse setting, and a pulse-value setting.

15. A commodity meter management system comprising:
   a commodity meter operating according to at least one actual configuration parameter;
   a server located remotely from the commodity meter;
   a communication medium coupled to the commodity meter and to the server;
   a transmitter coupled to the server to transmit at least one new configuration parameter to the meter via the communication medium;
   a receiver coupled to the meter to receive the at least one new configuration parameter from the server via the communication medium;
   a database coupled to the server, the database storing a default configuration parameter for the commodity meter; and
   an application adapted to reset the actual configuration parameter of the commodity meter to the default parameter of the commodity meter;
   the application being further adapted to record information regarding resetting of the actual configuration parameter to the default configuration parameter.

16. The commodity meter management system as claimed in claim 15, further comprising:
   a transmitter coupled to the commodity meter to transmit an actual configuration parameter to the server via the communication medium; and
   a receiver coupled to the server to receive the actual configuration parameter from the meter via the communication medium.

17. The commodity meter management system as claimed in claim 16, further comprising a communications application enabling bi-directional real-time communication between the commodity meter and the server.

18. The commodity meter management system as claimed in claim 16, wherein the transmitter coupled to the commodity meter and the receiver coupled to the commodity meter comprise a transceiver device.

19. The commodity meter management system as claimed in claim 16, wherein the transmitter coupled to the server and the receiver coupled to the server comprise a transceiver device.

20. The commodity meter management system as claimed in claim 15, further comprising:
   at least one additional commodity meter coupled to the server via a second communication medium, each additional commodity meter operating according to a respective actual configuration parameter; and
   a receiver coupled to each of the at least one additional commodity meters to receive at least one new configuration parameter from the server via the second communication medium.

21. The commodity meter management system as claimed in claim 15, further comprising:
   at least one additional commodity meter coupled to the server via a second communication medium, each additional commodity meter operating according to a respective actual configuration parameter; and
   a transmitter coupled to each of the at least one additional commodity meters to transmit a respective actual configuration parameter to the server via the second communication medium.

22. The commodity meter management system as claimed in claim 15, wherein the information includes at least one of a date and commodity meter identification information.

23. The commodity meter management system as claimed in claim 15, wherein the database stores the at least one new configuration parameter.

24. The commodity meter management system as claimed in claim 23, wherein the application is adapted to reset at least one actual configuration parameter of the commodity meter to at least one new configuration parameter.

25. A commodity meter management system comprising:
   a commodity meter operating according to at least one actual configuration parameter;
   a server located remotely from the commodity meter;
   a communication medium coupled to the commodity meter and to the server;
   a transmitter coupled to the server to transmit at least one new configuration parameter to the meter via the communication medium;
   a receiver coupled to the meter to receive the at least one new configuration parameter from the server via the communication medium;
   a database coupled to the server, the database storing the at least one new configuration parameter; and
   an application adapted to reset at least one actual configuration parameter of the commodity meter to at least one new configuration parameter;
   the application being further adapted to record information regarding resetting of the at least one actual configuration parameter to the at least one new configuration parameter.

26. The commodity meter management system as claimed in claim 25, wherein the communication medium is at least one of a packet-switched network, a serial communications network, a cellular digital packet data modem network, a two-way pager network, a satellite network, a power line carrier network, and a telephone network.

27. The commodity meter management system as claimed in claim 25, wherein the commodity meter is an energy meter.

28. The commodity meter management system as claimed in claim 25, wherein the actual configuration parameter is at least one of a potential transformer primary setting, a potential transformer secondary setting, a potential transformer ratio setting, a current transformer primary setting, a current transformer secondary setting, a current transformer ratio setting, a scale factor, a time-of-use schedule, a season schedule, a demand reset, an energy reset, a clock setting, an energy-per-pulse setting, and a pulse-value setting.

29. A commodity meter management system, comprising:
a plurality of commodity meters, each commodity meter operating according to an actual configuration parameter;
a server located remotely from each of the plurality of commodity meters; and
at least one communication medium coupled to each of the plurality of commodity meters and to the server;
the server and the plurality of commodity meters configured and arranged to transmit the actual configuration parameters from the plurality of commodity meters to the server;
a database coupled to the server, the database storing a default configuration parameter for at least one of the commodity meters; and
an application adapted to compare the default configuration parameter with the actual configuration parameter;
the application being further adapted to reset the actual configuration parameter to the default configuration parameter of at least one of the commodity meters;
the application being further adapted to record information regarding resetting of the actual configuration parameter to the default configuration parameter.

30. The commodity meter management system as claimed in claim 29, wherein the server and the plurality of commodity meters are configured and arranged to transmit new configuration parameters from the server to the plurality of commodity meters.

31. The commodity meter management system as claimed in claim 30, wherein the new configuration parameters are default parameters for the plurality of commodity meters.

32. The commodity meter management system as claimed in claim 29, wherein each of the plurality of commodity meters is coupled to the server by a respective communication medium.

33. The commodity meter management system as claimed in claim 29, further comprising a communications application enabling bi-directional real-time communication between the commodity meters and the server.

34. The commodity meter management system as claimed in claim 29, wherein the database stores a default configuration parameter for at least one of the commodity meters.

35. The commodity meter management system as claimed in claim 34, further comprising an application adapted to compare the default configuration parameter with the actual configuration parameter.

36. The commodity meter management system as claimed in claim 35, wherein the application is further adapted to reset the actual configuration parameter to the default configuration parameter of at least one of the commodity meters.

37. The commodity meter management system as claimed in claim 29, wherein the application is capable of real-time comparison of the default configuration parameter to the actual configuration parameter.

38. The commodity meter management system as claimed in claim 29, wherein the information includes at least one of a date and commodity meter identification information.

39. The commodity meter management system as claimed in claim 29, wherein the application is further adapted to generate at least one message responsive to detection of a default configuration parameter that is different than an actual configuration parameter.

40. The commodity meter management system as claimed in claim 29, wherein the application is adapted to reset the actual configuration parameter of at least one of the commodity meters to a new configuration parameter.

41. A commodity meter management system, comprising:
a plurality of commodity meters, each commodity meter operating according to an actual configuration parameter;
a server located remotely from each of the plurality of commodity meters;
at least one communication medium coupled to each of the plurality of commodity meters and to the server;
the server and the plurality of commodity meters configured and arranged to transmit the actual configuration parameters from the plurality of commodity meters to the server; and
an application adapted to reset the actual configuration parameter of at least one of the commodity meters to a new configuration parameter;
the application being further adapted to record information regarding resetting of the actual configuration parameter to the new configuration parameter.

42. The commodity meter management system as claimed in claim 41, wherein each communication medium is at least one of a packet-switched network, a serial communications network, a cellular digital packet data modem network, a two-way pager network, a satellite network, a power line carrier network, and a telephone network.

43. The commodity meter management system as claimed in claim 41, wherein at least one of the commodity meters is an energy meter.

44. The commodity meter management system as claimed in claim 41, wherein the actual configuration parameter is at least one of a potential transformer primary setting, a potential transformer secondary setting, a potential transformer ratio setting, a current transformer primary setting, a current transformer secondary setting, a current transformer ratio setting, a scale factor, a time-of-use schedule, a season schedule, a demand reset, an energy reset, a clock setting, an energy-per-pulse setting, and a pulse-value setting.

45. A commodity meter management system, comprising:
a plurality of commodity meters, each commodity meter operating according to an actual configuration parameter;
a server located remotely from each of the plurality of commodity meters;
at least one communication medium coupled to each of the plurality of commodity meters and to the server;
the server and the plurality of commodity meters configured and arranged to transmit the actual configuration parameters from the plurality of commodity meters to the server;
a database coupled to the server, the database storing a default configuration parameter for at least one of the commodity meters; and
an application adapted to compare the default configuration parameter with the actual configuration parameter;
the application being further adapted to reset the actual configuration parameter to the default configuration parameter of at least one of the commodity meters;
the application being further adapted to record information regarding resetting of the actual configuration parameter to the default configuration parameter.

46. The commodity meter management system as claimed in claim 45, wherein the server and the plurality of commodity meters are configured and arranged to transmit the actual configuration parameters of the commodity meters from the plurality of commodity meters to the server.

47. The commodity meter management system as claimed in claim 45, wherein each of the plurality of commodity meters is coupled to the server by a respective communication medium.

48. The commodity meter management system as claimed in claim 45, further comprising a communications application enabling bi-directional real-time communication between the commodity meters and the server.

49. The commodity meter management system as claimed in claim 45, wherein the application is capable of real-time comparison of the default configuration parameter to the actual configuration parameter.

50. The commodity meter management system as claimed in claim 45, wherein the information includes at least one of a date and commodity meter identification information.

51. The commodity meter management system as claimed in claim 45, wherein the application is further adapted to generate at least one message responsive to detection of a default configuration parameter that is different than an actual configuration parameter.

52. The commodity meter management system as claimed in claim 45, wherein each communication medium is at least one of a packet-switched network, a serial communications network, a cellular digital packet data modem network, a two-way pager network, a satellite network, a power line carrier network, and a telephone network.

53. The commodity meter management system as claimed in claim 45, wherein at least one of the commodity meters is an energy meter.

54. The commodity meter management system as claimed in claim 45, wherein the actual configuration parameter is at least one of a potential transformer primary setting, a potential transformer secondary setting, a potential transformer ratio setting, a current transformer primary setting, a current transformer secondary setting, a current transformer ratio setting, a scale factor, a time-of-use schedule, a season schedule, a demand reset, an energy reset, a clock setting, an energy-per-pulse setting, and a pulse-value setting.

55. The commodity meter management system as claimed in claim 45, wherein the application is further adapted to set the actual configuration parameter of one or more commodity meters to new configuration parameters.

56. A method of managing a plurality of commodity meters, the method comprising:
connecting the plurality of commodity meters to at least one server via at least one communication medium, each one of the plurality of commodity meters operating according to an actual configuration parameter;
retrieving a default configuration parameter for each of the plurality of commodity meters from a database;
communicating between the at least one server and each of the plurality of commodity meters in order to determine the actual configuration parameter;
comparing the actual configuration parameter to the default configuration parameter;
indicating a tamper event if the actual configuration parameter is not substantially equal to the default configuration parameter;
resetting the actual configuration parameter to the default configuration parameter if a tamper event is indicated; and
recording the resetting of the actual configuration parameter to the default configuration parameter.

57. The method as claimed in claim 56, further comprising changing the actual configuration parameter to a new configuration parameter.

58. The method as claimed in claim 57, further comprising recording the changing of the actual configuration parameter to the new configuration parameter.

59. The method as claimed in claim 56, wherein communicating includes communicating bi-directionally in real-time.

60. The method as claimed in claim 56, further comprising comparing the actual configuration parameter to the default configuration parameter in real-time.

61. A method of managing a plurality of commodity meters, the method comprising:
connecting the plurality of commodity meters to at least one server via at least one communication medium, each one of the plurality of commodity meters operating according to an actual configuration parameter;
retrieving a default configuration parameter for each of the plurality of commodity meters from a database;
communicating between the at least one server and each of the plurality of commodity meters in order to determine the actual configuration parameter;
comparing the actual configuration parameter to the default configuration parameter;
indicating a tamper event if the actual configuration parameter is not substantially equal to the default configuration parameter; and
recording at least one of a date and commodity meter information for the indicated tamper event.

62. The method as claimed in claim 61, further comprising creating a tamper event message when a tamper event is indicated.

63. The method as claimed in claim 62, further comprising using the tamper event message to dispatch personnel.

64. The method as claimed in claim 61, further comprising initiating communication at one of the at least one server and each one of the plurality of commodity meters.

65. The method as claimed in claim 61, further comprising connecting the plurality of commodity meters to the at least one server via at least one of a packet-switched network, a serial communications network, a cellular-digital-packet-data modem network, a two-way pager network, a satellite network, a power-line carrier network, and a telephone network.

66. The method as claimed in claim 61, wherein each one of the plurality of commodity meters is an energy meter, the method further comprising determining an actual configuration parameter of at least one of a potential transformer primary setting, a potential transformer secondary setting, a potential transformer ratio setting, a current transformer primary setting, a current transformer secondary setting, a current transformer ratio setting, a scale factor, a time-of-use schedule, a season schedule, a demand reset, an energy reset, a clock setting, a energy-per-pulse setting, and a pulse-value setting.

67. A method of managing a plurality of commodity meters, the method comprising:
connecting each one of the plurality of commodity meters to a server via one of a plurality of communication networks, the server located remotely from each one of the plurality of commodity meters;
communicating bi-directionally between the server and each one of the plurality of commodity meters via the plurality of communication networks;
each one of the plurality of commodity meters operating according to an actual configuration parameter;

communicating between the at least one server and each one of the plurality of commodity meters in order to determine the actual configuration parameter;

connecting a database to the at least one server;

storing a default configuration parameter for each one of the plurality of commodity meters in the database;

comparing the actual configuration parameter to the default configuration parameter;

indicating a tamper event if the actual configuration parameter is not substantially equal to the default configuration parameter;

resetting the actual configuration parameter to the default configuration parameter if a tamper event is indicated; and recording the resetting of the actual configuration parameter to the default configuration parameter.

68. The method as claimed in claim 67, wherein communicating includes communicating bi-directionally in real-time.

69. The method as claimed in claim 67, wherein comparing the actual configuration parameter to the default configuration parameter includes comparing the actual configuration parameter to the default configuration parameter in real-time.

70. A method of managing a plurality of commodity meters, the method comprising:

connecting each one of the plurality of commodity meters to a server via one of a plurality of communication networks, the server located remotely from each one of the plurality of commodity meters;

communicating bi-directionally between the server and each one of the plurality of commodity meters via the plurality of communication networks;

each one of the plurality of commodity meters operating according to an actual configuration parameter;

communicating between the at least one server and each one of the plurality of commodity meters in order to determine the actual configuration parameter;

connecting a database to the at least one server;

storing a default configuration parameter for each one of the plurality of commodity meters in the database;

comparing the actual configuration parameter to the default configuration parameter; and indicating a tamper event if the actual configuration parameter is not substantially equal to the default configuration parameter;

recording at least one of a date and commodity meter identification information for the indicated tamper event.

71. The method as claimed in claim 70, further comprising creating a tamper event message when a tamper event is indicated.

72. The method as claimed in claim 71, further comprising using the tamper event message to dispatch personnel.

73. The method as claimed in claim 70, further comprising changing the actual configuration parameter to a new configuration parameter.

74. A method of managing a plurality of commodity meters, the method comprising:

connecting each one of the plurality of commodity meters to a server via one of a plurality of communication networks, the server located remotely from each one of the plurality of commodity meters;

communcating bi-directionally between the server and each one of the plurality of commodity meters via the plurality of communication networks;

each one of the plurality of commodity meters operating according to an actual configuration parameter;

communicating between the at least one server and each one of the plurality of commodity meters in order to determine the actual configuration parameter;

changing the actual configuration parameter to a new configuration parameter; and recording the changing of the actual configuration parameter to the new configuration parameter.

75. The method as claimed in claim 74, further comprising initiating communication at one of the at least one server and each one of the plurality of commodity meters.

76. The method as claimed in claim 74, further comprising connecting each one of the plurality of commodity meters to the server via at least one of a packet-switched network, a serial communications network, a cellular-digital-packet-data modem network, a two-way pager network, a satellite network, a power-line carrier network, and a telephone network.

77. The method as claimed in claim 74, wherein each of the plurality of commodity meters is an energy meter, the method further comprising determining an actual configuration parameter of at least one of a potential transformer primary setting, a potential transformer secondary setting, a potential transformer ratio setting, a current transformer primary setting, a current transformer secondary setting, a current transformer ratio setting, a scale factor, a time-of-use schedule, a season schedule, a demand reset, an energy reset, a clock setting, a energy-per-pulse setting, and a pulse-value setting.

78. The method as claimed in claim 74, further comprising recording the changing of the actual configuration parameter to the new configuration parameter.

79. A method of managing a plurality of commodity meters, the method comprising:

connecting the plurality of commodity meters to at least one server via at least one communication medium, each one of the plurality of commodity meters configured to operate according to a default configuration parameter, the at least one server located remotely from each one of the plurality of commodity meters;

communicating between the at least one server and each one of the plurality of commodity meters;

connecting a database to the at least one server;

storing the default configuration parameter for each one of the plurality of commodity meters in the database;

changing the default configuration parameter to a new configuration parameter; and recording the changing of the actual configuration parameter to the new configuration parameter.

80. The method as claimed in claim 79, further comprising communicating bi-directionally in real-time.

81. The method as claimed in claim 79, further comprising connecting the plurality of commodity meters to at least one server via at least one of a packet-switched network, a serial communications network, a cellular-digital-packet-data modem network, a two-way pager network, a satellite network, a power-line carrier network, and a telephone network.

82. The method as claimed in claim 79, wherein each one of the plurality of commodity meters is an energy meter, the method further comprising determining the actual configuration parameter of at least one of a potential transformer primary setting, a potential transformer secondary setting, a potential transformer ratio setting, a current transformer primary setting, a current transformer secondary setting, a current transformer ratio setting, a scale factor, a time-of-use schedule, a season schedule, a demand reset, an energy reset, a clock setting, a energy-per-pulse setting, and a pulse-value setting.

83. A method of managing a plurality of commodity meters, the method comprising:
   receiving an actual configuration parameter for each one of the plurality of commodity meters;
   retrieving a default configuration parameter for each one of the plurality of commodity meters;
   comparing the actual configuration parameter to the default configuration parameter to determine if the actual configuration parameter is substantially equal to the default configuration parameter; and
   transmitting the default configuration parameter to each one of the plurality of commodity meters if the actual configuration parameter is not substantially equal to the default configuration parameter.

84. The method as claimed in claim 83, further comprising requesting the actual configuration parameter from each one of the plurality of commodity meters and each one of the plurality of commodity meters responding to the request by providing the actual configuration parameter.

85. The method as claimed in claim 83, further comprising receiving the default configuration parameter at each one of the plurality of commodity meters and writing the default configuration parameter over the actual configuration parameter at each one of the plurality of commodity meters.

86. The method as claimed in claim 85, further comprising recording the writing of the default configuration parameter over the actual configuration parameter.

87. The method as claimed in claim 83, further comprising changing the actual configuration parameter to a new configuration parameter.

88. The method as claimed in claim 83, further comprising comparing the actual configuration parameter to the default configuration parameter in real-time.

89. The method as claimed in claim 83, further comprising receiving the actual configuration parameter via at least one of a packet-switched network, a serial communications network, a cellular-digital-packet-data modem network, a two-way pager network, a satellite network, a power-line carrier network, and a telephone network.

90. The method as claimed in claim 83, wherein each one of the plurality of commodity meters is an energy meter, the method further comprising receiving an actual configuration parameter of at least one of a potential transformer primary setting, a potential transformer secondary setting, a potential transformer ratio setting, a current transformer primary setting, a current transformer secondary setting, a current transformer ratio setting, a scale factor, a time-of-use schedule, a season schedule, a demand reset, an energy reset, a clock setting, a energy-per-pulse setting, and a pulse-value setting.

* * * * *